US010127677B1

(12) United States Patent
Anderson-Sprecher et al.

(10) Patent No.: US 10,127,677 B1
(45) Date of Patent: *Nov. 13, 2018

(54) USING OBSERVATIONS FROM ONE OR MORE ROBOTS TO GENERATE A SPATIO-TEMPORAL MODEL THAT DEFINES POSE VALUES FOR A PLURALITY OF OBJECTS IN AN ENVIRONMENT

(71) Applicant: X Development LLC, Mountain View, CA (US)

(72) Inventors: Peter Elving Anderson-Sprecher, Mountain View, CA (US); Julian Mac Neille Mason, Redwood City, CA (US); Rohit Ramesh Saboo, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/599,232

(22) Filed: May 18, 2017

Related U.S. Application Data

(63) Continuation of application No. 14/834,980, filed on Aug. 25, 2015, now Pat. No. 9,691,151.

(51) Int. Cl.
*G06K 9/00* (2006.01)
*G06T 7/20* (2017.01)
(Continued)

(52) U.S. Cl.
CPC .............. *G06T 7/251* (2017.01); *G06T 7/344* (2017.01); *G06T 17/05* (2013.01); *G06T 2207/10012* (2013.01); *H04N 2013/0081* (2013.01)

(58) Field of Classification Search
CPC ......... G06T 7/251; G06T 7/344; G06T 17/05; H04N 13/0239
See application file for complete search history.

(56) References Cited

U.S. PATENT DOCUMENTS

| 5,363,305 A | 11/1994 | Cox et al. |
| 7,177,737 B2 * | 2/2007 | Karlsson ................ G01C 21/12 340/995.24 |

(Continued)

OTHER PUBLICATIONS

Konolige, K., & Bowman, J. (Oct. 2009). Towards Lifelong Visual Maps. In Intelligent Robots and Systems, 2009. IROS 2009. IEEE/RSJ International Conference on (pp. 1156-1163). IEEE.
(Continued)

*Primary Examiner* — David F Dunphy
(74) *Attorney, Agent, or Firm* — Middleton Reutlinger

(57) ABSTRACT

Methods, apparatus, systems, and computer-readable media are provided for generating and using a spatio-temporal model that defines pose values for a plurality of objects in an environment and corresponding times associated with the pose values. Some implementations relate to using observations for one or more robots in an environment to generate a spatio-temporal model that defines pose values and corresponding times for multiple objects in the environment. In some of those implementations, the model is generated based on uncertainty measures associated with the pose values. Some implementations relate to utilizing a generated spatio-temporal model to determine the pose for each of one or more objects an environment at a target time. The pose for an object at a target time is determined based on one or more pose values for the object selected based on a corresponding measurement time, uncertainty measure, and/or source associated with the pose values.

15 Claims, 8 Drawing Sheets

(51) Int. Cl.
*G06T 7/246* (2017.01)
*G06T 7/33* (2017.01)
*G06T 17/05* (2011.01)
*H04N 13/00* (2018.01)

(56) References Cited

U.S. PATENT DOCUMENTS

| | | | |
|---|---|---|---|
| 7,693,757 | B2 | 4/2010 | Zimmerman |
| 8,380,652 | B1* | 2/2013 | Francis, Jr. ............ B25J 9/1661 706/48 |
| 2010/0046791 | A1 | 2/2010 | Glickman et al. |
| 2010/0063735 | A1* | 3/2010 | Kindo ................. B60W 40/072 701/300 |
| 2011/0153137 | A1 | 6/2011 | Yeom |
| 2015/0127496 | A1 | 5/2015 | Marathe et al. |

OTHER PUBLICATIONS

Gallagher, G., Srinivasa, S. S., Bagnell, J. A., & Ferguson, D. (May 2009). GATMO: A Generalized Approach to Tracking Movable Objects. In Robotics and Automation, 2009. ICRA'09. IEEE International Conference on (pp. 2043-2048). IEEE.

Wolf, D. F., & Sukhatme, G. S. (2003). Towards Mapping Dynamic Environments. In Proceedings of the International Conference on Advanced Robotics (ICAR) (pp. 594-600).

Herbst, E., Henry, P., Ren, X., & Fox, D. (May 2011). Toward Object Discovery and Modeling via 3-D Scene Comparison. In Robotics and Automation (ICRA), 2011 IEEE International Conference on (pp. 2623-2629). IEEE.

Stilman, M., & Kuffner, J. J. (2005). Navigation Among Movable Obstacles: Real-Time Reasoning in Complex Environments. International Journal of Humanoid Robotics, 2(04), 479-503.

Pangercic, D., Pitzer, B., Tenorth, M., & Beetz, M. (Oct. 2012). Semantic Object Maps for Robotic Housework-Representation, Acquisition and Use. In Intelligent Robots and Systems (IROS), 2012 IEEE/RSJ International Conference on (pp. 4644-4651). IEEE.

Vasudevan, S., Gachter, S., Nguyen, V., & Siegwart, R. (2007). Cognitive Maps for Mobile Robots—An Object Based Approach. Robotics and Autonomous Systems, 55(5), 359-371.

Thrun, S. (2002). Robotic Mapping: A Survey. Exploring Artificial Intelligence in the New Millennium, 1-35.

Theodoridis, T., & Hu, H. (2009). Intelligent Security Robots: A Survey. Univ. Essex, Colchester, Tech. Rep. CES-503. 31 pages.

* cited by examiner

USING OBSERVATIONS FROM ONE OR MORE ROBOTS TO GENERATE A SPATIO-TEMPORAL MODEL THAT DEFINES POSE VALUES FOR A PLURALITY OF OBJECTS IN AN ENVIRONMENT

BACKGROUND

Robots may be programmed to perform a variety of tasks such as, for example, autonomous or semi-autonomous navigation, manipulating objects (e.g., repositioning an object, altering an object, and/or picking up an object and moving it to a different location), transporting objects (without necessarily manipulating those objects), monitoring environmental conditions, functioning as "video conferencing on wheels", and so forth. Various robots may utilize input from one or more sensors of the robot and/or a curated map of the robot's environment in performing various robotic tasks. For example, a robot may utilize one or more cameras, laser scanners, depth sensors, and/or other sensors to identify and avoid obstacles that are detected in a current movement trajectory of the robot. Also, for example, a robot may utilize a curated map and/or its sensor inputs in planning a movement trajectory to accomplish a task.

However, utilizing input from sensors of a robot to detect objects and act upon such detection may suffer from one or more drawbacks. For example, many sensors have a limited "field of view" and may not detect certain objects such as objects that are not in the line of sight of the sensor. Also, for example, some input from sensors of a robot that are related to an object may be "noisy" due to, for example, other objects "blocking" the line of sight of the sensors, the object being located a relatively far distance away from the sensor, etc. Moreover, utilizing input from a curated map may suffer from one or more drawbacks. For example, the map may be curated at a level of granularity where certain objects are not represented and/or the map may be stale and not reflect the introduction of new objects to the environment, the removal of objects from the environment, and/or a change to the pose of object in the environment. Additional and/or alternative drawbacks of the aforementioned techniques and/or other techniques may be presented.

SUMMARY

The present disclosure is generally directed to generating and using a spatio-temporal model that defines pose values for a plurality of objects in an environment and corresponding times associated with the pose values. As used herein, "pose" of an object may reference a position of the object only (e.g., a multidimensional coordinate), or may reference both the position of the object and an orientation of the object.

Some implementations of the technology relate to using observations for multiple robots in an environment to generate a spatio-temporal model that defines pose values and corresponding times for multiple objects in the environment. In some of those implementations, the model is generated based on uncertainty measures associated with the pose values. An uncertainty measure for a pose value may be determined based on uncertainty associated with an object observation component of an observation utilized to generate the value and based on uncertainty associated with a localization observation component of the observation. Generating the model based on the uncertainty measures associated with the pose values may include filtering a plurality of the pose values and corresponding times from the spatio-temporal model based on uncertainty measures and/or assigning uncertainty measures to the corresponding pose values in the spatio-temporal model.

Some implementations of the technology relate to utilizing a generated spatio-temporal model to determine the pose for each of one or more objects an environment at a target time. The pose for an object at a target time is determined based on one or more selected pose values for the object in the spatio-temporal model. In some of those implementations, the selected pose values may each be selected based on a corresponding measurement time, uncertainty measure, and/or source associated with the pose values in the spatio-temporal model. For example, in some scenarios a group of a plurality of pose values may be selected based on proximity of corresponding measurement times for the pose values of the group to the target time, and based on the pose values of the group each being associated with the same source. Also, for example, in some scenarios a group of a plurality of pose values from multiple sources may be selected based on proximity of corresponding measurement times for the pose values of the group to the target time, and based on a quantity of the pose values of the group satisfying a threshold.

In some implementations, a method may be provided that includes receiving observations for multiple robots in an environment over a period of time. The observations each include an object observation generated by a corresponding robot of the robots that defines, for a corresponding time in the period of time: a corresponding identifier of a corresponding object of multiple objects of the environment and a measured object pose for the corresponding object. The measured object pose is generated based on at least one sensor of the corresponding robot. The observations also each include a localization observation for the corresponding robot that defines, for the corresponding time: a measured source pose for the sensor utilized to generate the measured object pose. The method further includes: generating, for each of the observations and based on the measured object pose of the observation, a pose value for the corresponding object of the observation with respect to a reference frame; and generating, for each of the pose values, an uncertainty measure based on both the object observation and the localization observation of the observation utilized to generate the pose value. The uncertainty measures are each indicative of a degree of uncertainty in a corresponding one of the pose values. The method further includes generating, based at least in part on the uncertainty measures, a spatio-temporal model that defines the pose values and the corresponding times for a plurality of the objects of the environment. Generating the spatio-temporal model based at least in part on the uncertainty measures includes one or both of: filtering a plurality of the pose values and the corresponding times from the spatio-temporal model based on the uncertainty measures; and assigning the uncertainty measures to the corresponding pose values in the spatio-temporal model.

This method and other implementations of technology disclosed herein may each optionally include one or more of the following features.

The object observations may each further include corresponding first sensor data related to the sensor of the robot utilized to generate the corresponding measured object pose and the localization observations may each further include corresponding second sensor data related to at least one localization sensor utilized to generate the measured source pose. Generating, for each of the pose values, the uncertainty measure based on both the object observation and the localization observation may include generating the uncertainty measure based on the corresponding first sensor data and the corresponding second sensor data. In some implementations, the first sensor data of a given observation of the observations indicates a sensor type of the sensor and the second sensor data indicates a sensor type of the localization sensor. In some of those implementations, generating the uncertainty measure for the given observation based on the first sensor data and the second sensor data includes generating the uncertainty measure based on a first error measure associated with the sensor type of the sensor and a second error measure associated with the sensor type of the localization sensor. In some implementations, the first sensor data indicates a first error measure associated with the sensor and the second sensor data indicates a second error measure associated with the localization sensor.

The object observations may each further include a corresponding object observation uncertainty measure associated with the corresponding measured object pose and the localization observations may each further include a corresponding localization observation uncertainty measure associated with the corresponding measured source pose. Generating, for each of the pose values, the uncertainty measure based on both the object observation and the localization observation may include generating the uncertainty measure based on the corresponding object observation uncertainty measure and the corresponding localization observation uncertainty measure. In some implementations, the object observation uncertainty measures and the corresponding localization observation uncertainty measures are each covariance measures.

The localization observation for at least one of the observations may be based at least in part on a sensor reading of a sensor located external to the corresponding robot.

The method may further include: accessing the generated spatio-temporal model to determine a pose for an object of the objects of the spatio-temporal model at a target time; identifying one or more pose values for the object in the spatio-temporal model based on proximity of the target time to the corresponding measurement times for the pose values; and determining a pose for the object for the target time based on at least one of the identified pose values. In some implementations, identifying the pose values for the object in the spatio-temporal model based on proximity of the target time to the corresponding measurement times for the pose values includes selecting only a single pose value based on the measurement time for the single pose value being more proximal to the target time than the measurement time of any other of the pose values. In some other implementations, identifying the pose values for the object in the spatio-temporal model includes selecting a plurality of the pose values and determining the pose for the object for the target time based on the pose values includes determining the pose for the object based on the selected plurality of the pose values. In some of those other implementations, generating the spatio-temporal model further includes associating each of the pose values with a source identifier, wherein each of the source identifiers indicates a corresponding source of the corresponding observation on which the corresponding pose value is based; and selecting the plurality of the pose values includes selecting the plurality of the pose values based on each of the selected plurality of the pose values being associated with the same source identifier in the spatio-temporal model.

Generating the spatio-temporal model based at least in part on the uncertainty measures may include assigning the uncertainty measures to the corresponding pose values in the spatio-temporal model. In some implementations, the method may further include: accessing the generated spatio-temporal model to determine a pose for an object of the objects of the spatio-temporal model at a target time; selecting at least one pose value for the object in the spatio-temporal model based on the uncertainty measure for the at least one pose value and based on proximity of the target time to the measurement time for the at least one pose value; and determining a pose for the object for the target time based on the selected at least one pose value.

In some implementations, a method may be provided that includes receiving a group of observations for multiple robots in an environment over a period of time. The observations of the group each include an object observation generated by a corresponding of the robots that defines, for a corresponding time in the period of time: a corresponding identifier of a corresponding object of multiple objects of the environment and a measured object pose for the corresponding object. The measured object pose is generated based on at least one sensor of the corresponding robot. The observations of the group each further include a localization observation for the corresponding robot that defines, for the corresponding time, a measured source pose for the sensor utilized to generate the measured object pose. The method further includes: generating, for each of the observations of the group, pose values for a corresponding object with respect to a reference frame, wherein generating a given pose value of the pose values is based on the measured object pose for the corresponding object; generating a spatio-temporal model that defines, for each of a plurality of the objects of the environment, the pose values, the corresponding times, and the corresponding robots for each of a plurality of the observations; accessing the generated spatio-temporal model to determine a pose for an object of the objects of the spatio-temporal model at a target time; selecting a plurality of pose values for the object in the spatio-temporal model based on proximity of the target time to the corresponding measurement times for the pose values; and determining the pose for the object for the target time based on the selected pose values.

This method and other implementations of technology disclosed herein may each optionally include one or more of the following features.

Generating the spatio-temporal model may further include associating each of the pose values with a source identifier and selecting the plurality of the pose values may include selecting the plurality of the pose values based on each of the selected plurality of the candidate pose values being associated with the same source identifier in the spatio-temporal model. Each of the source identifiers indicates a corresponding source of the corresponding observation on which the corresponding pose value is based.

Generating the spatio-temporal model may further include associating each of the pose values with a source identifier and selecting the plurality of the pose values may include selecting the plurality of the pose values based on determining the selected plurality of the pose values are associated with multiple source identifiers in the spatio-temporal model and that a quantity of the selected plurality of the pose values satisfies a threshold. Each of the source identifiers indicates a corresponding source of the corresponding observation on which the corresponding pose value is based.

The method may further include receiving an area indication for the target time that defines one or more areas and selecting the plurality of the pose values may be based on proximity of the target time to the corresponding measurement times for the pose values and based on the pose values defining a position that is proximal to or within the one or more areas defined by the area indication.

Other implementations may include a non-transitory computer readable storage medium storing instructions executable by a processor to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
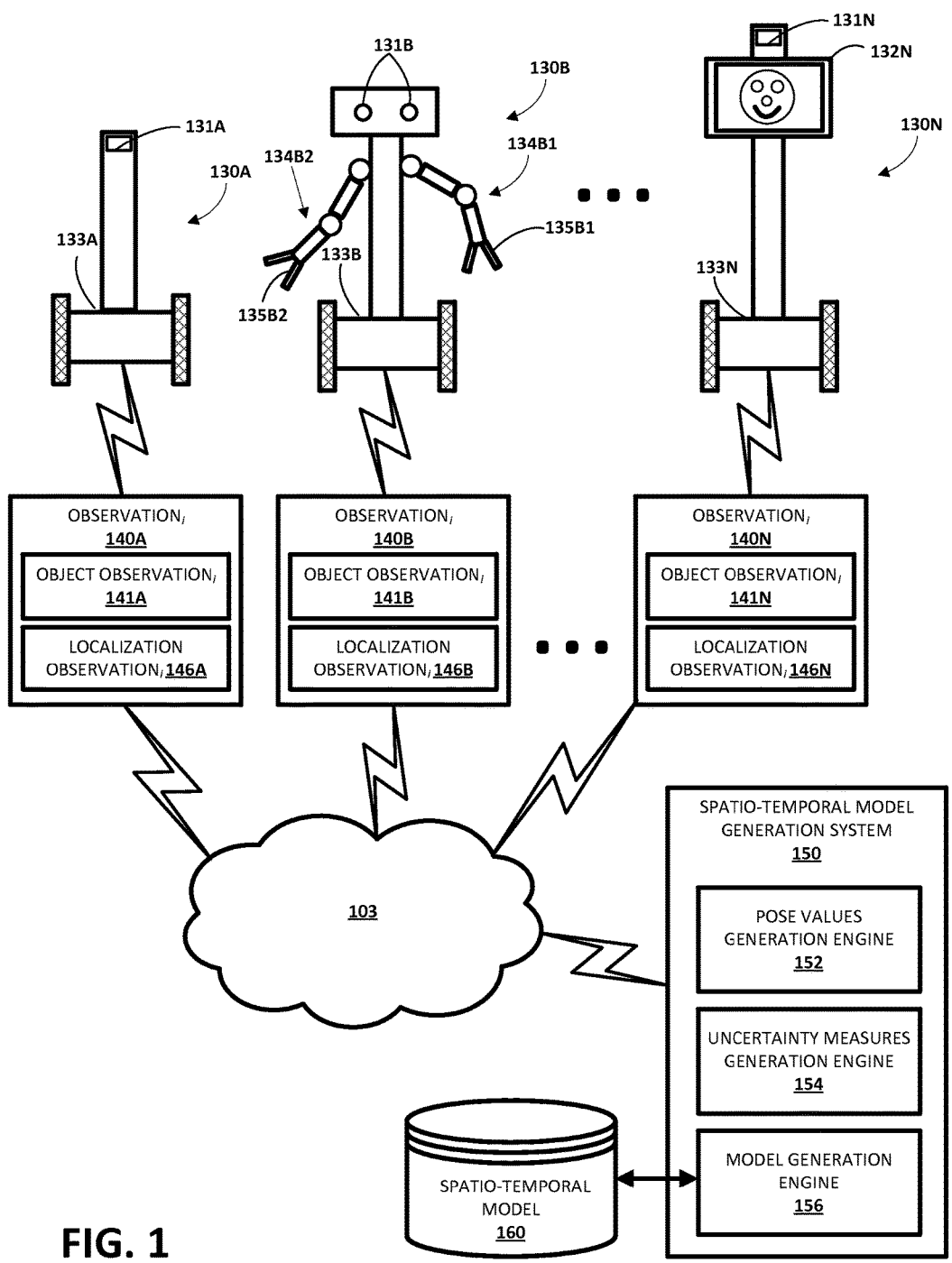
FIG. 1 illustrates an example environment in which a spatio-temporal model that defines pose values and corresponding times for multiple objects in an environment may be generated based on observations from multiple robots.

FIG. 1 illustrates an example environment in which a spatio-temporal model 160 that defines pose values and corresponding times for multiple objects in an environment may be generated based on observations from multiple robots 130A-N. Three robots 130A, 1306, and 130N are illustrated in the example environment of FIG. 1. Additional robots may also be present as indicated by the ellipsis of FIG. 1 that is positioned between robot 1306 and robot 130N. Also provided in the environment of FIG. 1 is a spatio-temporal model generation system 150, a spatio-temporal model 160, a network 103, and observations 140A, 1406, and 140N. The observations 140A, 1406, and 140N may be provided to system 150 by corresponding robots 130A, 1306, and 130N to generate a spatio-temporal model 160 according to techniques described herein. The network 103 may include one or more networks such as a local area network (LAN) and/or or wide area network (WAN) such as the Internet. In other implementations, a direct connection between one or more components may be utilized.

Each of the robots 130A-N may be located in an environment such as a building (e.g., a warehouse, a manufacturing facility, an office building), one or more buildings of a collection of nearby buildings, one or more floors of a multi-floor office or other building, etc. Additional and/or alternative robots may be provided in other implementations, such as additional robots that vary in one or more respects from those illustrated in FIG. 1. For example, autonomous or semi-autonomous forklift robots may be provided as the only robots and/or with other robots in some implementations.

Each of the robots 130A, 1306, and 130N includes a corresponding base 133A, 133B, and 133N with wheels provided on opposed sides thereof for locomotion of a corresponding of the robots 130A, 1306, and 130N. Each of the bases 133A, 133B, and 133N may include, for example, one or more motors for driving corresponding wheels to achieve a desired direction, velocity, and/or acceleration of movement for the corresponding robot 130A, 130B, and 130N.

Each of the robots 130A, 130B, and 130N also includes at least one pose vision device that includes one or more corresponding pose vision sensors. As used herein, a pose vision sensor is a sensor that can sense data related to shape, color, and/or other features of an object that is in the line of sight of the sensor, wherein the sensed data can be used (optionally in combination with other data) to determine a location and/or orientation of the object. As one example of a pose vision device, the robots 130A and 130 N include corresponding 3D laser scanners 131A and 131N that each include one or more lasers that emit light and one or more sensors that collect data related to reflections of the emitted light to enable determination of location and/or orientation of various objects. The laser scanners 131A and 131N may be, for example, time-of-flight 3D laser scanners or triangulation based 3D laser scanners and may include a position sensitive detector (PSD) or other optical position sensor. As another example of a pose vision device, the robot 130B includes a stereo camera 131B that includes two sensors (e.g., charge-coupled devices (CCDs)), each at a different vantage point. By comparing data sensed by the two sensors at different vantage points, position and/or orientation of various objects may be determined. As yet another example of a pose vision device, a robot may include a machine vision camera that includes a sensor that captures data related to, inter alio, fiducial tags on objects. Data related to a fiducial tag on an object can be utilized to detect the fiducial tag and determine position and/or orientation of the object based on the fiducial tag. Although specific examples of pose vision devices and associated sensors are described herein, additional and/or alternative pose vision devices and associated sensors may be utilized.

Each of the robots 130A, 130B, and 130N also includes one or more controllers that, for example, provide control commands to actuators and/or other operational components thereof, generate all or aspects of observations described herein, receive and act upon one or more object poses determined based on a spatio-temporal model, and/or receive and act upon control commands such as those generated based at least in part on object poses determined based on a spatio-temporal model. For example, one or more controllers of robot 130A may provide control commands to servo motors that drive the wheels of the robot 130A to navigate the robot 130A to various locations in the environment autonomously, semi-autonomously, and/or based on control commands provided by a user via a computing device of the user. Also, for example, one or more controllers of robot 130A may establish a network connection with spatio-temporal model generation system 150 via a network interface of the robot 130A, and provide all or aspects of observations 140 to the system 150. Additional description of some examples of the structure and functionality of various robots is provided herein.

The robot 130A may be a monitoring/observation robot that moves around an environment and collects data via the 3D laser scanner 131A and/or other sensors, but that doesn't perform any additional non-monitoring/observation tasks. The robot 130B includes robot arms 134B1 and 134B2 with corresponding end effectors 135B1 and 135B2, that each take the form of a gripper with two opposing "fingers" or "digits." The robot arms 134B1, 134B2 and end effectors 135B1, 135B2 may be controlled autonomously, semi-autonomously, and/or based on control commands provided by a user via a computing device of a user. For example, the robot arm 134B1 may be autonomously controlled to position the end effector 135B1 proximal to an object and the end effector 135B1 may be autonomously controlled to grasp the object. The robot 130N is a telepresence robot that includes a display screen 132N and may provide mobile videoconferencing among other functionalities. For example, the robot 130N may be utilized to enable a user at a remote computing device to receive a "live view" from the robot 130N (e.g., via an additional camera of the robot 130N) and/or to display some indicia of the user on the display screen 132B. The indicia of the user may be, for example, an image of the user, a live video feed from a camera coupled to the user's computing device, etc. Although a heterogeneous group of robots is illustrated in FIG. 1, robots in an environment may be homogenous in other implementations.

The robots 130A-N provide corresponding observations 140A-N to the spatio-temporal model generation system 150 via network 103 and the spatio-temporal model generation system 150 generates the spatio-temporal model 160 based on the provided observations. Generating the spatio-temporal model 160 may include updating the model 160 to reflect changes in the environment indicated by the observations such as the movement of objects in the environment, the introduction of new objects to the environment, or the removal of objects from the environment. The spatio-temporal model generation system 150 may update the model 160 continuously, periodically, based on receipt of one or more new observations, and/or based on other criteria.

The robots 130A-N may provide observations 140A-N under various circumstances. For example, the robots 130A-N may provide the observations 140A-N when they are already engaged in another task (e.g., robot 130B may provide observations 140B as it is navigating to a location to perform a task) and/or when they are not engaged in another non-monitoring/observation task (e.g., instead of sitting idle, a robot may move throughout the environment to provide observations). As indicated by the subscript "i" provided with the observations 140A, 140B, and 140N of FIG. 1, a robot 130A, 130B, 130N will typically provide a plurality of observations over a period of time. For example, the observations 140A of robot 130A include a plurality of observations, with each of the observations being for a different moment in time.

Each of the observations 140A-N includes a corresponding object observation 141A-N and a corresponding localization observation 146A-N. The object observations 141A-N may each include: an identifier of an object, a measured object pose for the object, an indication of the measurement time for the measured object pose, and optionally a covariance measure and/or object sensor data related to one or more sensors utilized to generate the measured object pose.

The identifier of a measured object may be, for example based on a fiducial tag on the object, a radio-frequency identification (RFID) tag (passive or active) of the object, and/or feature points of the object, and may be determined by a corresponding one of the robots 130A-N based on various techniques. For example, when the identifier is based on a fiducial tag on the object (e.g., a QUICK RESPONSE (QR) code or other barcode, an alphanumeric tag), robot 130A may determine the identifier of a measured object based on extracting the identifier from the fiducial tag in an image of the object captured by the robot 130A. Also, for example, when the identifier is based on a RFID tag of the object, robot 130A may include a RFID reader that reads the RFID tag and an ID signal of the read RFID tag utilized as the identifier. Also, for example, when the identifier is based on feature points of the object, robot 130A may utilize the laser scanner 131A, a camera, and/or other sensor to generate the feature points and determine the identifier based on those feature points.

The measured object pose for the object may be determined by a corresponding one of the robots 130A-N based on data sensed by one or more sensors of a corresponding one of pose vision devices 131A-N. The measured object pose for the object may be provided as a single pose, such as a single mean pose in the SE(3) configuration space—or may be provided as a pose with a covariance measure, such as a mean pose in the SE(3) configuration space with an associated Gaussian covariance measure within the 6-dimensional tangent space around the mean. The covariance measure may provide an indication of uncertainty associated with the object observation and may be based on, for example, uncertainty associated with the one or more sensors utilized to generate the measured object pose (e.g., differing uncertainty for different sensor types, uncertainty based on time since sensor calibration) and/or uncertainty associated with a distance between the measured object pose and the measured robot/sensor pose (e.g., uncertainty may increase with increasing distance). As described in more detail herein, in some implementations, the uncertainty measures generation engine 154 of spatio-temporal model generation system 150 may utilize a covariance measure of a measured object pose in generating an uncertainty measure for the measured object pose. In some other implementations, the covariance measure may not be utilized in generating the uncertainty measure for the measured object pose.

The indication of the measurement time for the measured object pose indicates a time at which the sensor data on which the measured object pose is based was sensed. The measurement time may be based on the time at which the sensor data was sensed, or may be based on another event such as the time at which the measured object pose was determined. In some implementations, one or more (e.g., all) of the object observation components 141A-N may omit the measurement time and the measurement time may be inferred by the spatio-temporal model generation system 150 based on a time of receipt of the corresponding observations 140A-N.

The optional object sensor data related to one or more sensors utilized to generate the measured object pose may identify one or more characteristics of those sensors. For example, the sensor data may identify the type of a sensor (e.g., PSD, CCD); a particular model of the sensor, an error measure associated with the sensor, a most recent calibration date of the sensor, the type of pose vision device in which the sensor is implemented, etc. As described in more detail herein, in some implementations the uncertainty measures generation engine 154 of spatio-temporal model generation system 150 may utilize sensor data in generating an uncertainty measure for a corresponding measured object pose.

The localization observations 146A-N may each include: a measured source pose for the one or more sensors utilized to generate the corresponding measured object pose at the measurement time. In other words, the measured source pose of a localization observation indicates the pose of the corresponding robot and/or the corresponding sensor of the robot when the measurement for the object pose was taken. The localization observations 146A-N may also optionally include a source identifier, a covariance measure, and/or localization sensor data related to one or more sensors utilized to generate the measured source pose.

The measured source pose for the object may be provided as a single pose, such as a single mean pose in the SE(3) configuration space—or may be provided as a pose with a covariance measure, such as a mean pose in the SE(3) configuration space with an associated Gaussian covariance measure within the 6-dimensional tangent space around the mean. The covariance measure may provide an indication of uncertainty associated with the localization observation and may be based on, for example, one or more sensors (of the robot or external to the robot) utilized to generate the measured source pose (e.g., differing uncertainty for different sensor types, uncertainty based on time since sensor calibration) and/or uncertainty associated with a distance between the robot/sensor and the sensor utilized to generate the measured source pose (in implementations where that sensor is external to the robot).

In some implementations, the measured source pose for the object may be determined by a corresponding one of the robots 130A-N based on data sensed by one or more sensors thereof. Various localization techniques may be utilized by the robots 130A-N to determine a measured source pose such as particle filters, landmark detection, and/or GPS. In some implementations, one or more sensors external to a robot may be utilized to determine the measured source pose for the robot. For example, a measurement from a stationary camera viewing the robot may be utilized to determine the measured source pose for the robot. The measurement may be correlated to the robot based on, for example, a fiducial marker and/or RFID tag of the robot and the measurement may be timestamped to correlate the measurement to a corresponding measurement time of an object observation. As another example, a measurement from another robot viewing a given robot may be utilized to determine the measured source pose for the given robot. The measurement may be correlated to the robot based on, for example, a fiducial marker and/or RFID tag of the robot and the measurement may be timestamped to correlate the measurement to a corresponding measurement time of an object observation. In some implementations, a measurement from another robot viewing a given robot may be utilized to determine the measured source pose for the given robot when the given robot does not itself provide a measured source pose (e.g., the given robot lacks an appropriate sensor or includes an appropriate sensor but is unable to localize). It is noted that the measurement from another robot utilize to determine the measured source pose for a given robot may be a measured object pose from the other robot, where the object of the measured object pose is the given robot. A measurement from one or more sensors external to the robot may be utilized as the sole source for a measured source pose of the robot and/or combined with measurements from other sensors (of the robot or external to the robot) to determine the measured source pose of the robot.

The optional localization sensor data related to one or more sensors utilized to generate the measured source pose may identify one or more characteristics of the sensors. For example, the sensor data may identify the type of a sensor (e.g., PSD, CCD); a particular model of the sensor, an error measure associated with the sensor, a most recent calibration date of the sensor, etc. As described in more detail herein, in some implementations, the uncertainty measures generation engine 154 of spatio-temporal model generation system 150 may utilize localization sensor data in generating an uncertainty measure for a corresponding measured object pose.

The source identifier 148A1 may identify the robot and/or the sensor of the robot utilized to determine the measured object pose. For example, the source identifier 148A1 may be a unique identifier of the robot utilized to determine the measured object pose and/or a unique identifier of the sensor of the robot utilized to determine the measured object pose.

Spatio-temporal model generation system 150 may include one or computing systems connected by one or more networks (not depicted) and may use observations 140A-N to generate spatio-temporal model 160 that defines pose values and corresponding times for multiple objects in the environment accessible by the robots 130A-N. An example of such a computing system is depicted schematically in FIG. 7. Various modules or engines may be implemented as part of spatio-temporal model generation system 150 as software, hardware, or any combination of the two. For example, in FIG. 1 system 150 includes a pose values generation engine 152, an uncertainty measures generation engine 154, and a model generation engine 156. Although examples below are discussed with respect to observations 140A-N for robots 130A-N, in some implementations the spatio-temporal model generation system 150 may also use observations for fixed sensors not mounted on robots to determine at least some of the pose values and corresponding times for one or more of the objects in the environment. For example, an observation for a fixed sensor not mounted on a robot may include an object observation and a localization observation. The localization observation may include a measured source pose that is based on a known fixed pose for the fixed sensor.

The pose values generation engine 152 is configured to determine, for each of the observations 140A-N, a pose value for the object indicated by the observation for the measurement time indicated by the observation. The pose values determined by the pose values generation engine 152 are with respect to a reference frame, such as a so called "world frame." For example, the measured source pose of a localization observation 146A of one of the observations 140A may be with respect to the reference frame and the measured object pose of an object observation 141A of that observation may be with respect to a sensor utilized to determine the measured object pose. The pose values generation engine 152 may determine a pose value in the reference frame based on modifying the measured object pose in view of the measured source pose. In other words, the pose values generation engine 152 may use the measured source pose to transform the measured object pose into the reference frame.

The model generation engine 156 stores the pose values determined by the pose values generation engine 152 in the spatio-temporal model 160, along with the corresponding object identifiers of the pose values and the corresponding measurement times of the pose values. Accordingly, the generated model 160 may define, for each of a plurality of objects, a plurality of pose values and associated measurement times for the object. Notably, each of the determined and stored pose values is from a different observation of the observations 140A-N and the observations 140A-N are from a plurality of corresponding robots 130A-N. In some implementations, the model generation engine 156 also associates, in the model 160, each of one or more of the pose values with a source identifier that identifies the robot and/or sensor that provided the measured object pose on which the pose value is based. For example, for a pose value determined based on one of the observations 140A, the model generation engine 156 may associate the pose value with an identifier of the robot 130A and/or the sensor of 131A in the model 160.

In some implementations, the model generation engine 156 generates the model 160 based on uncertainty measures associated with the pose values determined by pose values generation engine 152. The uncertainty measures generation engine 154 may generate the uncertainty measure for each of one or more of the pose values based on uncertainty associated with the corresponding object observation and uncertainty associated with the corresponding localization observation. For example, the uncertainty measures generation engine 154 may generate the uncertainty measure for a pose value based on an average of the uncertainty associated with the corresponding object observation and the uncertainty associated with the corresponding localization observation, optionally weighting the uncertainties differently in determining the average.

In some implementations, the uncertainty associated with an object observation of a robot may be determined at the robot and provided with the object observation. For example, as described above, uncertainty for an object observation may be provided in the form of a covariance measure or other probability distribution for the measured object pose for the object observation. In some implementations, the uncertainty associated with an object observation of a robot may be determined by uncertainty measures generation engine 154 based on the optional object sensor data provided with the object observation and/or other factors. For example, the uncertainty measures generation engine 154 may determine, from a mapping of sensors and uncertainty measures, an uncertainty measure that corresponds to the type of a sensor and/or model of the sensor provided in sensor data. Also, for example, the uncertainty measures generation engine 154 may determine the uncertainty measure as a function of one or more of the type of the sensor, the model of the sensor, the error measure associated with the sensor, the most recent calibration date of the sensor, the type of pose vision device in which the sensor is implemented, and/or the distance between the sensor and the object as indicated by the measured object pose.

As with the uncertainty for the object observation, the uncertainty associated with a localization observation may be determined at the robot (or a component external to the robot that generates the localization observation) and provided in the form of a covariance or other probability distribution for the measured source pose for the localization observation. In some implementations, the uncertainty associated with a localization observation of a robot may be determined by uncertainty measures generation engine 154 based on the optional sensor data provided with the localization observation and/or other factors.

In some implementations where the model generation engine 156 generates the model 160 based on uncertainty measures associated with the pose values determined by pose values generation engine 152, the model generation engine 156 may assign the uncertainty measures to corresponding pose values, times, and optional source identifications in the model 160. For instance, where uncertainty measures are scaled from 0 to 1 or other range, the model 160 may define, for each of a plurality of objects, tuples that each include at least: a pose value for a corresponding time, the corresponding time, and an uncertainty measure for the pose value for the corresponding time. In some implementations where the model generation engine 156 generates the model 160 based on uncertainty measures associated with the pose values determined by pose values generation engine 152, the model generation engine 156 may filter out certain pose values and corresponding times from the model 160 based on the uncertainty measures. For instance, the pose value for a corresponding time may be filtered from the model 160 based on a corresponding uncertainty measure failing to satisfy a threshold (and optionally based on one or more other criteria being met).

In some implementations, the model generation engine 156 may filter out certain pose values and corresponding times from the model 160 based on the uncertainty measures and assign uncertainty measures to corresponding unfiltered pose values, times, and optional source identifications in the model 160. For example, the model generation engine 156 may filter out any pose values having uncertainty measures that fail to satisfy a threshold, and may assign the uncertainty measures of any remaining pose values to those pose values in the model 160.

The values and relationships of the spatio-temporal model 160 may be stored in the model 160 in various manners. For example, the spatio-temporal model 160 may be an index with object identifiers being index values that each point to tuples that each include at least: a pose value for a corresponding time, the corresponding time, an uncertainty measure for the pose value for the corresponding time, and/or a corresponding source identifier. Also, for example, the spatio-temporal model may have a graph topology with the object identifiers being nodes and the nodes each connected to a central node by one or more edges. Each of the edges may be based on a corresponding observation and may include attributes such as a corresponding object pose value, a corresponding measurement time, a corresponding uncertainty measure, and/or a corresponding source identifier. For instance, a given node may have a plurality of edges, with each of the edges being based on a corresponding observation. As yet another example, the spatio-temporal model may have a graph topology with object identifiers being nodes and the source identifiers also being nodes. The object identifier nodes may each be connected to one or more source identifier nodes by one or more edges, wherein each edge is based on an observation for the corresponding source identifier for the corresponding object identifier. For example, a given edge may be between a given object identifier node and a given source identifier node and may be based on an observation for the object represented by the given object identifier node by the source represented by the given source identifier node. The given edge may include attributes such as a corresponding object pose value, a corresponding measurement time, and/or a corresponding uncertainty measure.

While robots 130A-N and system 150 are depicted separately in FIG. 1, this is not meant to be limiting. In various implementations, one or more aspects of spatio-temporal model generation system 150 may be implemented on one or more of the robots 130A-C. For example, all or aspects of one or more of the engines 152, 154, and/or 156 may be distributed across multiple of the robots 130A-N. For instance, one or more of the robots 130A-N may include one or more aspects of engines 152 and/or 156 to lessen the computing load on system 150. In implementations where the robots 130A-N and system 150 are separate components, they may communicate over one or more wired or wireless networks or using other wireless technology, such as radio, Bluetooth, infrared, etc.

Figure 2:
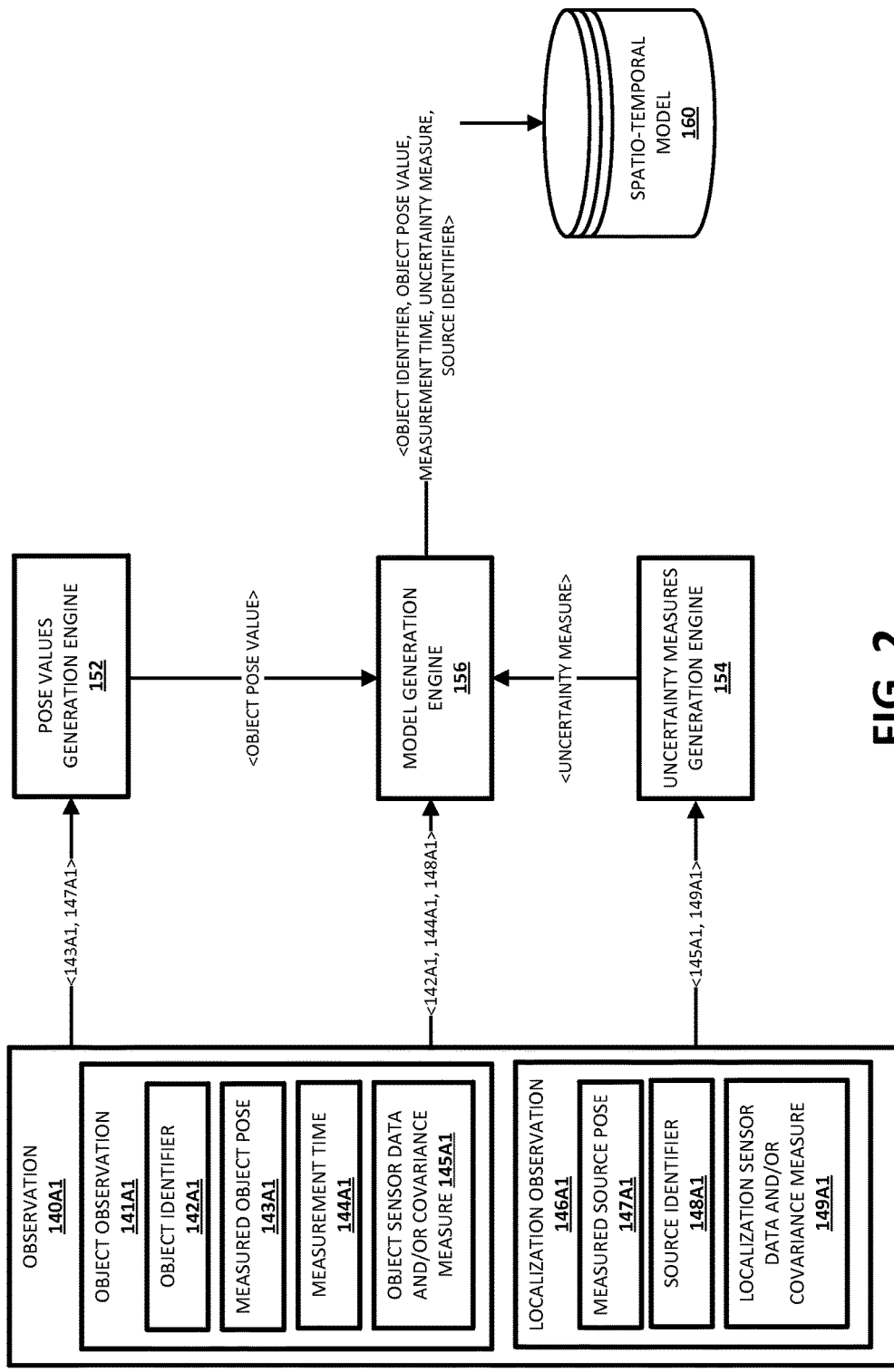
FIG. 2 illustrates an example of using an observation of a robot to generate a portion of a spatio-temporal model.

FIG. 2 illustrates an example of using an observation of a robot to generate a portion of a spatio-temporal model. In FIG. 2 an observation 140A1 of observations 140A (FIG. 1) is illustrated and includes an object observation 141A1 and a localization observation 146A1. The object observation 141A1 includes an object identifier 142A1, a measured object pose 143A1, a measurement time 144A1, and object sensor data and/or a covariance measure 145A1. The localization observation 146A1 includes a measured source pose 147A1, a source identifier 148A1 (identifier of the robot and/or source related to the measured object pose), and localization sensor data and/or a covariance measure 149A1.

The pose values generation engine 152 uses both the measured object pose 143A1 and the measured source pose 147A1 to determine an object pose value. For example, the measured source pose 147A1 may be with respect to a reference frame and the measured object pose 143A1 may be with respect to a sensor whose measurement were utilized to determine the measured object pose 143A1, and the pose values generation engine 152 may use the measured source pose to transform the measured object pose into the reference frame. The object pose value is provided to model generation engine 156.

The uncertainty measures generation engine 154 uses the object sensor data and/or the covariance measure 145A1 and uses the localization sensor data and/or the covariance measure 149A1 to generate an uncertainty measure. For example, where 145A1 includes the covariance measure for the measured object pose 143A1 and 149A1 includes the covariance measure for the measured source pose 147A1, the uncertainty measures generation engine 154 may generate the uncertainty measure based on a nonlinear convolution of the two uncertainty measures. Also, for example, where 145A1 includes object sensor data and 149A1 includes localization sensor data, the uncertainty measures generation engine 154 may generate the uncertainty measure as a function of the object sensor data and the localization sensor data. For instance, the uncertainty measures generation engine 154 may access a mapping that indicates uncertainty values for various sensor data to identify particular values for the particular object sensor data and the localization sensor data. The uncertainty measures generation engine 154 may further determine an uncertainty measure as a function of those values. For instance, the function may be multiplying those values, taking an average of those values (weighted or unweighted), or some other function. Regardless of the technique utilized, the uncertainty measure is provided to model generation engine 156.

The model generation engine 156 generates an entry for the spatio-temporal model 160 that includes the object pose value, the uncertainty measure, the object identifier 142A1, the measurement time 144A1, and the source identifier 148A1.

Although FIG. 2 is described with respect to a single observation, it is understood that the technique of FIG. 2 may be utilized to generate additional portions of spatio-temporal model 160 utilizing additional observations 140A-N. Observations 140A-N may be processed as they are received to keep the spatio-temporal model 160 up to date.

Figure 3A:
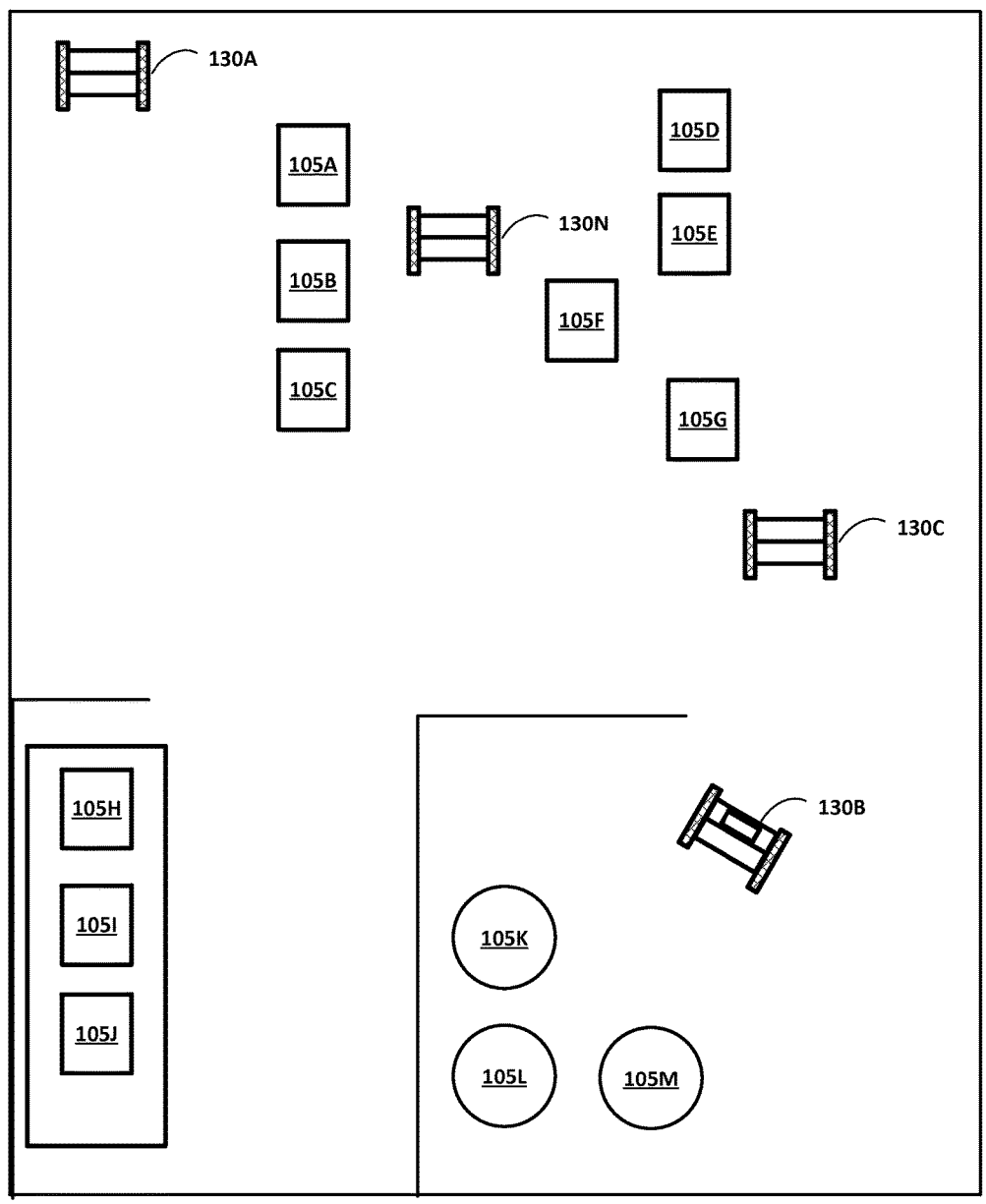
FIG. 3A illustrates a plan view of a portion of a building at a first time.
Figure 3B:
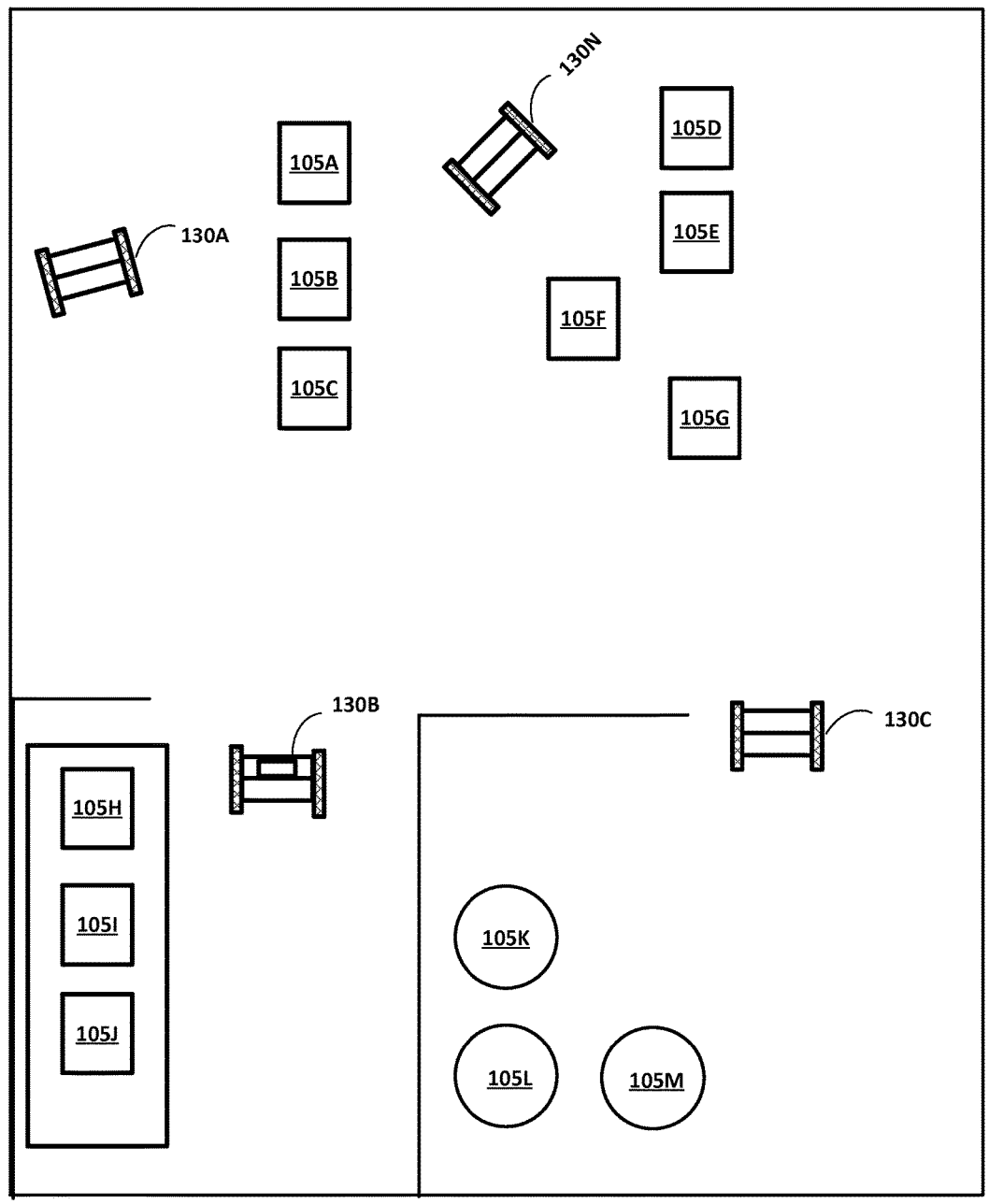
FIG. 3B illustrates the plan view of the portion of the building at a second time that is later than the first time of FIG. 3A.
Figure 3C:
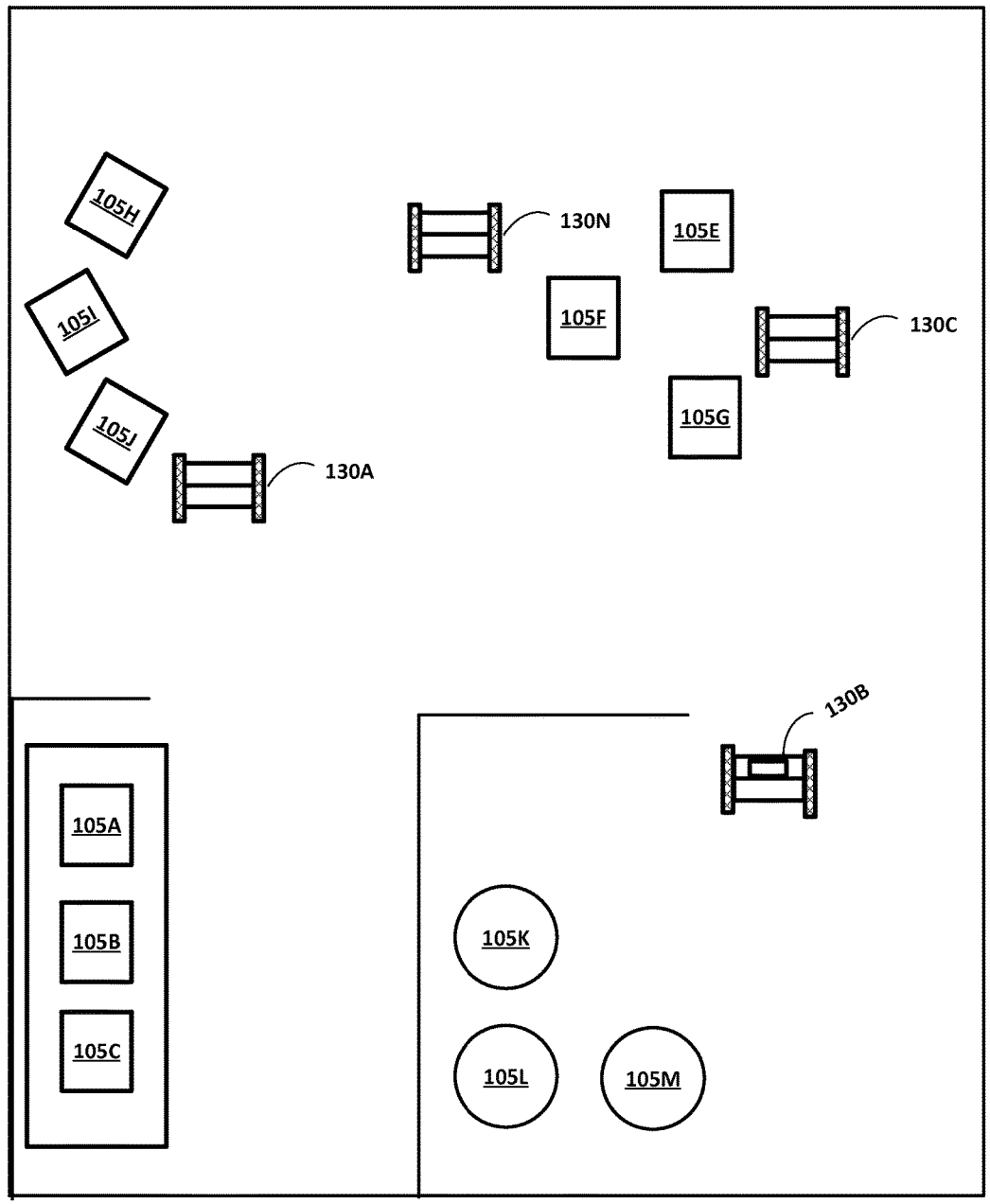
FIG. 3C illustrates the plan view of the portion of the building at a third time that is later than the second time of FIG. 3B.

With reference to FIGS. 3A-3C, examples are provided of robots 130A, 130B, 130C, and 130N moving through an environment and determining and providing observation data related to objects 105A-M in the environment. FIG. 3A illustrates a plan view of a portion of a building at a first time. At the first time objects 105A-M are illustrated in their respective positions and the robots 130A, 130B, 130C, and 130N are also illustrated in their respective positions. The objects 105A-H may be, for example, boxes, pallets, and/or other objects. The objects 105K-M may be, for example, drums, barrels, and/or other objects. At the first time of FIG. 3A, each of one or more of the robots 130A, 130B, 130C, and 130N may provide corresponding observations that include object observations with a measured object pose for one or more of the objects 105A-M. For example, object 105A may be in the field of view of one or more sensors of robot 130A and robot 130A may provide an object observation with an identifier of object 105A and a measure object pose for object 105A.

FIG. 3B illustrates the plan view of the portion of the building at a second time that is later than the first time of FIG. 3A. The objects 105A-M have the same poses in FIG. 3B as they do in FIG. 3A. However, the robots 130A, 130B, 130C, and 130N have all moved as the result of performing a task (an observation/monitoring task or non-observation/monitoring task). At the second time of FIG. 3B, each of one or more of the robots 130A, 130B, 130C, and 130N may provide corresponding observations that include object observations with a measured object pose for one or more of the objects 105A-M. It is noted that multiple observations may have also been provided between the first time of FIG. 3A and the second time of FIG. 3B.

FIG. 3C illustrates the plan view of the portion of the building at a third time that is later than the second time of FIG. 3B. The objects 105K-M have the same poses in FIG. 3C as they do in FIGS. 3A and 3B. However, the objects 105A-C and 105 E-M all have different poses as the result of movement by one or more humans, movement by one or more human controlled machines, and/or movement by one or more robots (that may include one or more of robots 130A, 130B, 130C, and 130N). The object 105D is no longer present in FIG. 3C due to movement of object 105D out of the environment. Moreover, the robots 130A, 130B, 130C, and 130N have all moved as the result of performing a task (an observation/monitoring task or non-observation/monitoring task). At the third time of FIG. 3C, each of one or more of the robots 130A, 130B, 130C, and 130N may provide corresponding observations that include object observations with a measured object pose for one or more of the objects 105A-M. It is noted that multiple observations may have also been provided between the second time of FIG. 3B and the second time of FIG. 3C. The spatio-temporal model 160 may be updated to reflect the changes in FIG. 3C according to techniques described herein. Having an updated spatio-temporal model 160 may enable, for example, updated object poses to be provided to the robots 130A, 130B, 130C, and 130N (and/or other robot(s)) to enable them to plan paths to avoid one or more of the objects 105A-M, to more quickly locate a particular object 105A-M, etc.

Figure 4:
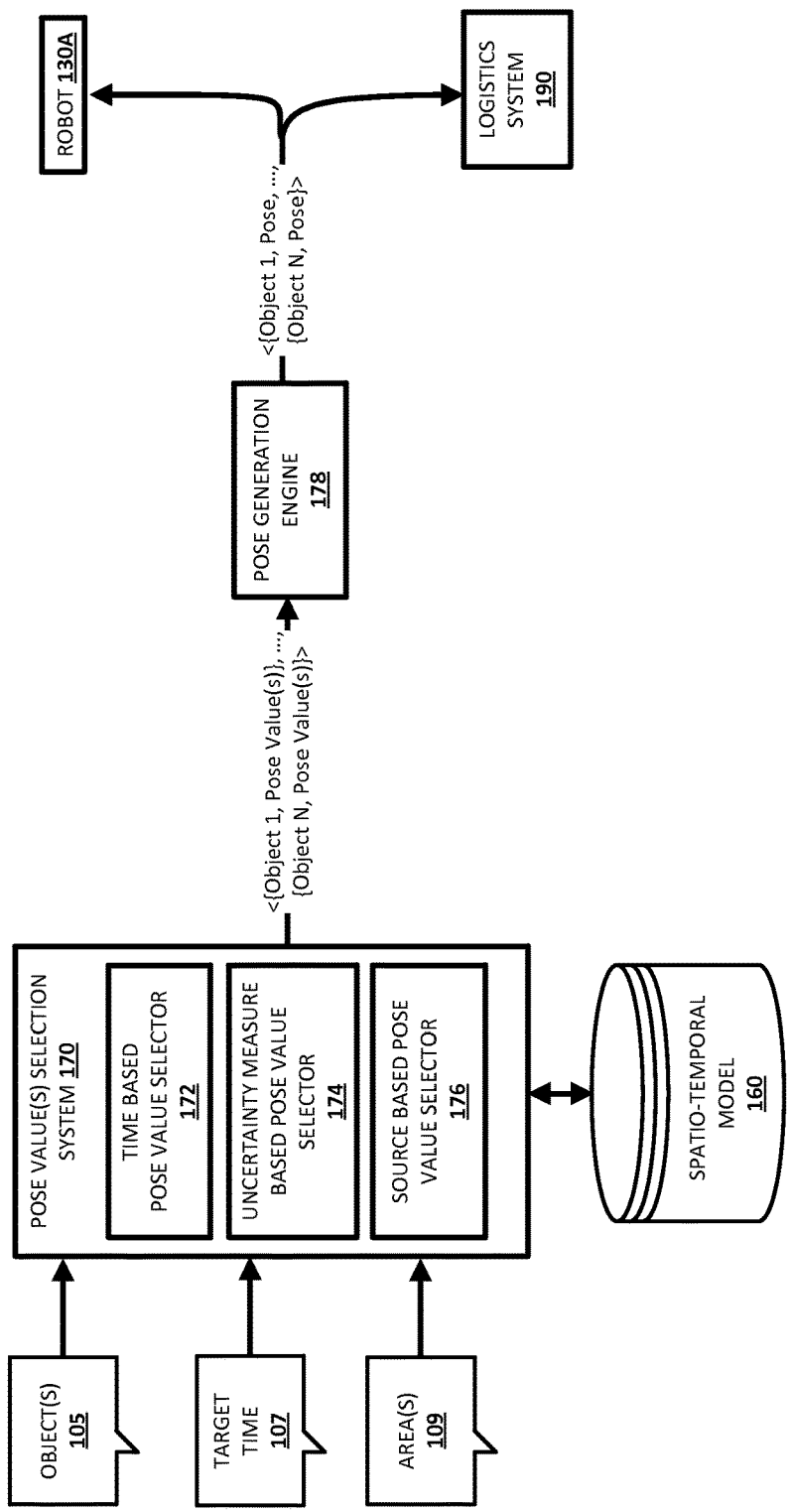
FIG. 4 illustrates an example of utilizing a generated spatio-temporal model to determine the pose for each of one or more objects of an environment at a target time.

FIG. 4 illustrates an example of utilizing a generated spatio-temporal model to determine the pose for each of one or more objects of an environment at a target time. Pose value(s) selection system 170 is illustrated in FIG. 4 and may include one or computing systems connected by one or more networks. The system 170 uses a target time 107, and optionally additional criteria such as object identifier(s) 105 and/or area identifier(s) 109 to determine, based on spatio-temporal model 160, the pose for each of one or more objects in an environment at a target time. Various modules or engines may be implemented as part of pose value(s) selection system 170 as software, hardware, or any combination of the two. For example, in FIG. 4, system 170 includes a time based pose value selector 172, an uncertainty measure based pose value selector 174, and a source based pose value selector 176.

In some scenarios, the pose value(s) selection system 170 may determine all object identifiers in an environment and their poses for a target time 107. The target time 107 may be, for example, a "current time" or an earlier time such as "1 hour ago", "yesterday at 2:30 PM", etc. In some scenarios, the pose value(s) selection system 170 may determine poses for a target time 107 for only certain object identifiers of an environment identified by object identifier(s) 105, such as object identifiers 105 provided by a particular robot (e.g., in response to sensing of those object identifiers by the robot) and/or object identifiers 105 provided by logistics system 190 (e.g., to determine the pose value of one or more objects at a target time). In some scenarios, the pose value(s) selection system 170 may determine poses for a target time 107 for any object identifiers of an environment that have pose values with measurement times proximate to the target time 107 and that are within one or more areas identified by area identifier(s) 109. For example, area identifier(s) 109 may be areas proximal to a path to be traversed by a particular robot and the pose value(s) selection system 170 may determine current poses for any object identifiers that have pose values that are proximate to the current time and that are within the areas.

The pose value(s) selection system 170 utilizes one or more of the selectors 172, 174, and 176, in view of the target time 107 and/or other criteria, to select a group of one or more pose values for each of one or more object identifiers from spatio-temporal model 160. The pose value(s) selection system 170 provides the selected group of one or more pose values for each of one or more object identifiers to the pose generation engine 178, and the pose generation engine 178 determines a pose for each of the object identifiers for the target time based on the provided information.

In some scenarios, the selected group of pose values for an object identifier that is provided to the pose generation engine 178 by pose value(s) selection system 170 may include only a single pose value for that object identifier and the pose generation engine 178 may determine the pose based on the single pose value (e.g., that pose value may be used as the pose). In some implementations, the selected group of pose values for an object identifier that is provided to the pose generation engine 178 by pose value(s) selection system 170 may include multiple pose values for that object identifier and the pose generation engine 178 may determine the pose based on the multiple pose values. For example, the pose generation engine 178 may interpolate between the multiple pose values to determine the pose, average the multiple pose values to determine the pose, and or otherwise combine the multiple pose values to determine the pose. The pose generation engine 178 provides the determined poses and corresponding object identifiers to one or more components such as robot 130A and/or logistics system 190.

Multiple non-exhaustive examples are provided below of various selectors 172, 174, and 176 and associated criteria that may be employed by pose value(s) selection system 170 and various techniques that may be utilized by pose generation engine 178 to determine the pose for each of one or more objects of an environment at a target time.

In some implementations, the system 170 may employ only the time based pose value selector 172 to select, from spatio-temporal model 160, a group of one or more pose values for each of one or more object identifiers. As one example, for each of one or more object identifiers in the model 160, the time based pose value selector 172 may select the pose value for that object identifier that is associated with a measurement time that is most proximal to the target time and that pose value may be provided to the pose generation engine 178 as the pose value for the corresponding object identifier. The pose generation engine 178 may determine the pose for each object identifier based on the single pose value provided for the object identifier (e.g., that pose value may be used as the pose).

As another example, for each of one or more object identifiers that have at least one pose value in the model 160 with a corresponding measurement time that is within a threshold of the target time (e.g., within 1 minute, 5 minutes, 1 second, 0.5 seconds, 30 seconds), the time based pose value selector 172 may select the pose value for that object identifier that is associated with a measurement time that is most proximal to the target time and that pose value may be provided to the pose generation engine 178 as the pose value for the corresponding object identifier. The pose generation engine 178 may determine the pose for each object identifier based on the single pose value provided for the object identifier (e.g., that pose value may be used as the pose).

As yet another example, for each of the object identifiers that have at least one pose value in the model 160 with a corresponding measurement time that is within a threshold of the target time, the time based pose value selector 172 may select multiple of the pose values that are within the threshold of the target time for that object identifier. For example, the time based pose value selector 172 may select all of the pose values that are within the threshold of the target time, or may select the X (e.g., 2, 5, 10) pose values with measurement times that are most proximal to the target time. Regardless of the selection criteria, the time based pose value selector 172 may provide the selected pose values and corresponding object identifiers to the pose generation engine 178. The pose generation engine 178 may determine the pose for each object identifier as a function of the corresponding multiple pose values provided for the object identifier. For example, the pose generation engine 178 may determine a pose for an object identifier based on averaging the multiple pose values for that object identifier, optionally weighting more heavily one or more of the provided pose values that have measurement times more proximal in time to the target time than the measurement times of other of the provided pose values.

In some implementations, the system 170 may employ the time based pose value selector 172 and the uncertainty measure based pose value selector 174 to select, from spatio-temporal model 160, a group of one or more pose values for each of one or more object identifiers.

As one example, for each of one or more object identifiers that have at least one pose value in the model 160 with a corresponding measurement time that is within a threshold of the target time, the time based pose value selector 172 may select multiple of the pose values that are within the threshold of the target time for that object identifier. The selected multiple pose values for the object identifiers may be provided to the uncertainty measure based pose value selector 174. In some implementations, the uncertainty measure based pose value selector 174 may, for each of one or more object identifiers, select a subset of the provided pose values for the object identifier based on uncertainty measures associated with the provided pose values in model 160. For example, the uncertainty measure based pose value selector 174 may select a single pose value for the object identifier that is associated with the uncertainty measure least indicative of uncertainty. As another example, the uncertainty measure based pose value selector 174 may select multiple pose values for the object based on each of those pose values being associated with a corresponding uncertainty measure that satisfies a threshold.

As yet another example, the uncertainty measure based pose value selector 174 may generate modified uncertainty measures for each of the provided pose values based on modifying the uncertainty measure in view of the difference between the measurement time of the corresponding pose value and the target time. For example, the uncertainty measure of a pose value may be modified based on the difference between the measurement time of the pose value and the target time, wherein the greater the difference, the more indicative of uncertainty the modified uncertainty measure becomes. Pose values for an object may be selected based on the modified uncertainty measures satisfying a threshold. After modified pose values are generated, the uncertainty measure based pose value selector 174 may select a single pose value for the object identifier that is associated with the modified uncertainty measure least indicative of uncertainty—or may select multiple pose values for the object identifier based on each of those pose values being associated with a corresponding modified uncertainty measure that satisfies a threshold.

As one specific example, assume: a first pose value for an object identifier has a first uncertainty measure and has a measurement time that is 30 seconds before a target time; a second pose value for the object has a second uncertainty measure and has a measurement time that is 0.2 seconds before the target time; and the first uncertainty measure is more indicative of certainty than the second uncertainty measure. Based solely on the uncertainty measures, the first pose value may be selected without selection of the first pose value. However, if the differences between the target and measurement times is utilized to generate a modified uncertainty measure, the second pose value may be selected in some scenarios based on the modified uncertainty measure (since the measurement time for the second pose value is relatively close to the target time) and/or the first pose value may not be selected in some scenarios (since the measurement time for the first pose value is relatively far from the target time).

In some implementations, the system 170 may employ the time based pose value selector 172 and the source based pose value selector 176 to select, from spatio-temporal model 160, a group of one or more pose values for each of one or more object identifiers.

As one example, for each of one or more object identifiers that have at least one pose value in the model 160 with a corresponding measurement time that is within a threshold of the target time, the time based pose value selector 172 may select multiple of the pose values that are within the threshold of the target time for that object identifier. The selected multiple pose values for the object identifiers may be provided to the source based pose value selector 176. In some implementations, the source based pose value selector 176 may, for each of one or more objects, select a subset of the provided pose values for the object identifier based on those pose values all being associated with the same source identifier.

The source based pose value selector 176 may utilize various techniques to determine the source identifier with which the subset of the selected pose values for an object identifier is associated. For example, the source based pose value selector 176 may select the source identifier based on it being associated with one or more pose values for the object identifier (provided by the time based pose value selector 172) that have uncertainty measures indicative of the least amount of uncertainty. Also, for example, the source based pose value selector 176 may select the source identifier based on it being associated with one or more pose values for the object identifier (provided by the time based pose value selector 172) that have corresponding measurement times that are nearer in time to the target time 107 than the measurement times of pose values corresponding to other source identifier(s). Also, for example, modified uncertainty measures may be determined as described above, and the source based pose value selector 176 may select the source identifier based on it being associated with one or more pose values for the object identifier that have modified uncertainty measures indicative of the least amount of uncertainty. Also, for example, the source based pose value selector 176 may randomly select a source identifier.

Regardless of the selection criteria, the source based pose value selector 176 may provide the single source identifier selected pose values and corresponding object identifiers to the pose generation engine 178. The pose generation engine 178 may determine the pose for each object identifier as a function of the corresponding multiple pose values provided for the object identifier. For example, the pose generation engine 178 may determine a pose for an object identifier based on an interpolating the multiple pose values for that object, optionally weighting more heavily one or more of the provided pose values that have measurement times more proximal in time to the target time than the measurement times of other of the provided pose values.

In some implementations, the source based pose value selector 176 may be utilized in response to determining a quantity of pose values of a group of pose values selected by time based pose value selector 172 and/or uncertainty measure based pose value selector 174 fails to satisfy a threshold. For example, if the quantity is less than 10 or other integer, the source based pose value selector 176 may be utilized. Determination of a pose based on pose values corresponding to a single source identifier may provide a more stable estimate over time (relative to determination based on pose values of multiple source identifiers) when the quantity fails to satisfy a threshold, as there may not be varying error characteristics with the single source.

In some implementations, the source based pose value selector 176 may not be utilized if it is determined a quantity of pose values of a group of pose values selected by time based pose value selector 172 and/or uncertainty measure based pose value selector 174 satisfies a threshold. In some of those implementations, multiple pose values associated with multiple source identifiers may be utilized and provided to pose generation engine 178 to determine a pose since the quantity may be large enough to yield a satisfactorily stable estimate.

In some implementations, the system 170 may employ the time based pose value selector 172, the uncertainty measure based pose value selector 174, and the source based pose value selector 176 to select, from spatio-temporal model 160, a group of one or more pose values for each of one or more object identifiers. For example, the selector 172 may be utilized to select a group of a plurality of pose values for each of one or more object identifiers based on proximity of the corresponding measurement times to the target times. The selector 172 may provide the selected groups to the selector 174 which may filter one or more of the pose values from the selected groups based on the uncertainty measure (or modified uncertainty measure) for those filtered pose values being indicative of too much uncertainty. The selector 174 may provide the filtered selected groups to the selector 176, which may determine groups to provide to pose generation engine 178 according to techniques such as those described above.

In some implementations, which of selectors 172, 174, and/or 176 is employed by system 170 for a given instance and/or how the employed selectors are utilized may be dependent on one or more properties of the given instance. Properties of the given instance may include, for example, an entity that is requesting poses for objects for that instance (e.g., whether it is a robot or a logistics system, properties of the robot if it is a robot) and/or one or more properties associated with a task for which the instance is requested (e.g., whether it is for a robot task, whether it is for a "high accuracy" robot task or a "low accuracy" robot task, whether it is a "path planning" task).

Also, in some implementations, different selectors 172, 174, and/or 176 may be utilized to select pose values for different objects for a single instance and/or one or more of the selectors may be utilized in multiple ways for the single instance. For example, for a given instance with a given target time, the time based pose value selector 172 may be the only selector utilized for certain objects, while the time based pose value selector 172 and the selector 174 and/or the selector 176 may be utilized for certain other objects. As one example, the time based pose value selector 172 may first seek to select, for each of a plurality of objects, a single pose value for each of those objects if the single pose value has a corresponding measurement time that is the most proximal to the target time and that is within 0.5 seconds of the target time. For any objects that do not have a single pose value that meets those criteria, the time based value selector 172 may select any pose values that have corresponding measurement times that are within 5 seconds of the target time. Those selected pose values may then be provided to the pose generation engine 178, or provided the selectors 174 and/or 176 for further selection according to techniques such as those described above.

Regardless of the selectors utilized, the pose value(s) selection system 170 provides the selected group of one or more pose values for each of one or more object identifiers to the pose generation engine 178, and the pose generation engine 178 determines a pose for each of the objects for the target time based on the provided information. The pose generation engine 178 provides the determined poses and corresponding object identifiers to one or more components such as robot 130A and/or logistics system 190.

In some implementations, the determined object identifiers and their poses may be utilized by one or more robots (or a control system controlling aspects of multiple robots) for path planning, obstacle avoidance, and/or other purposes. In some implementations, the target time may be a past time and the determined objects and their poses may be utilized by one or more systems for various purposes. In some implementations, such a system may be logistics system 190 that may utilize the determined object identifiers and their poses for inventory tracking, process analysis, process improvement, tracking the pose history of a particular object over time, etc.

In some implementations, robot 130A and/or other robot may compare one or more poses and/or an uncertainty estimate (optionally modified based on difference between the measurement time and the target time) for an object identifier as provided by pose generation engine 178 to one or more measured poses and/or corresponding uncertainty estimates for that object identifier as recently determined by the robot, and select one of the poses and/or combine the poses based on such comparison. For example, the robot may select the pose that has the uncertainty estimate least indicative of uncertainty. Also, for example, the robot may average and/or otherwise combine one or more of the model based poses and the measured pose(s) as recently determined by the robot, optionally weighting the poses based on corresponding uncertainty measurements.

Figure 5:
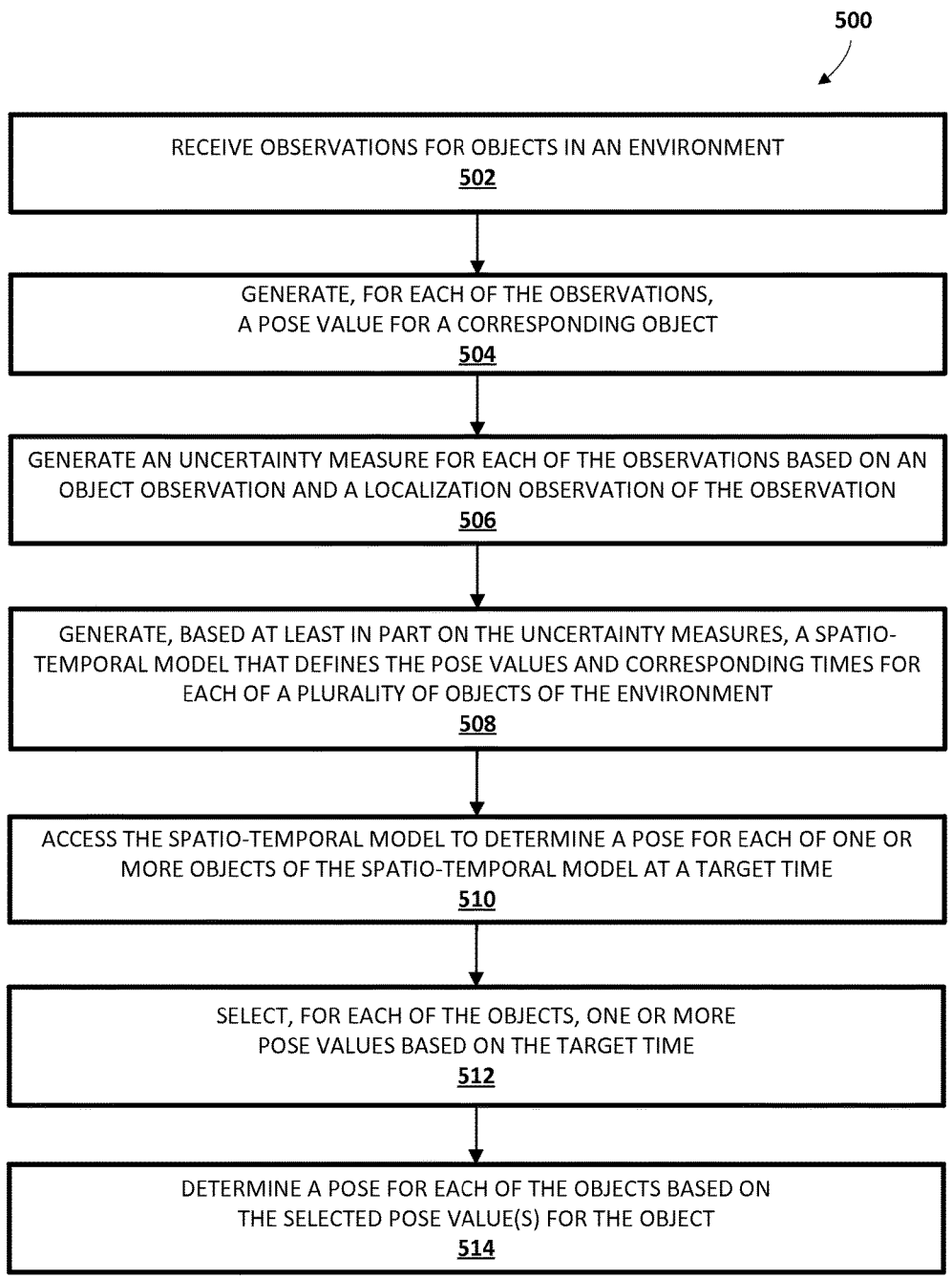
FIG. 5 depicts a flow chart illustrating an example method of generating and utilizing a spatio-temporal model that defines pose values and corresponding times for multiple objects in an environment.

FIG. 5 depicts a flow chart illustrating an example method of generating and utilizing a spatio-temporal model that defines pose values and corresponding time for multiple objects in an environment. For convenience, the operations of the flow chart are described with reference to a system that performs the operations. This system may include various components of various computer systems, such as spatio-temporal model generation system 150 of FIG. 1 and/or pose value(s) selection system 170 of FIG. 4. Moreover, while operations of method 500 are shown in a particular order, this is not meant to be limiting. One or more operations may be reordered, omitted or added.

At block 502, the system receives observations for objects in an environment. The observations are for multiple robots of the environment and each of the observations includes a corresponding object observation and a corresponding localization observation. The object observations may each include: an identifier of an object, a measured object pose for the object, an indication of the measurement time for the measured object pose, and optionally a covariance measure and/or object sensor data related to one or more sensors utilized to generate the measured object pose. The localization observations may each include: a measured source pose for the one or more sensors utilized to generate the corresponding measured object pose at the measurement time; a source identifier; a covariance measure; and/or localization sensor data related to one or more sensors utilized to generate the measured source pose. In some implementations, at least the object observations of the received observations are generated by the robots. The localization observations of the received observations may be generated by the robots and/or by one or more components that are separate from the robots, such as a localization system that generates measured source poses for one or more robots.

At block 504, the system generates, for each of the observations, a pose value for a corresponding object. The system may generate the pose value for an observation based on the measured object pose and the measured source pose of the observation. In some implementations, the system generates the pose value based on transforming the measured object pose into a reference frame. For example, the measured source pose may be with respect to a reference frame and the measured object pose may be with respect to a sensor utilized to determine the measured object pose. The system may determine a pose value in the reference frame based on modifying the measured object pose in view of the measured source pose.

At block 506, the system generates an uncertainty measure for each of the observations based on an object observation and a localization observation of the observation. The system may generate the uncertainty measure for each of one or more of the pose values based on uncertainty associated with the corresponding object observation and uncertainty associated with the corresponding localization observation. For example, the system may generate the uncertainty measure for a pose value based on an average of the uncertainty associated with the corresponding object observation and the uncertainty associated with the corresponding localization observation, optionally weighting the uncertainties differently in determining the average. The uncertainty associated with an object observation may be based on a covariance measure and/or sensor data of the object observation. The uncertainty associated with a localization observation may be based on a covariance measure and/or sensor data of the localization observation.

At block 508, the system generates a spatio-temporal model based at least in part on the uncertainty measures. The generated spatio-temporal model defines the pose values and corresponding times for each of a plurality of objects of the environment. In some implementations, the system may assign the uncertainty measures to corresponding pose values, times, and optional source identifications in the model. For instance, where uncertainty measures are scaled from 0 to 1 or other range, the model may define, for each of a plurality of objects, tuples that each include at least: a pose value for a corresponding time, the corresponding time, and an uncertainty measure for the pose value for the corresponding time. In some implementations, the system may additionally and/or alternatively filter out certain pose values and corresponding times from the model based on the uncertainty measures. For instance, the pose value for a corresponding time may be filtered from the model based on a corresponding uncertainty measure failing to satisfy a threshold (and optionally based on one or more other criteria being met).

At block 510, the system accesses the spatio-temporal model to determine a pose for each of one or more objects of the spatio-temporal model at a target time.

At block 512, the system selects, for each of the objects, one or more pose values based on the target time. For example, the system may select, from the spatio-temporal model and for each of one or more objects, pose values for the object based on a corresponding measurement time, uncertainty measure, and/or source associated with the pose values.

At block 514, the system determines a pose for each of the objects based on the selected pose value(s) for the object. In some scenarios, the selected pose values for an object may include only a single pose value for that object and the system may determine the pose based on the single pose value (e.g., that pose value may be used as the pose). In some implementations, the pose values for an object may include multiple pose values for that object and the system may determine the pose based on the multiple pose values. For example, the system may interpolate between the multiple pose values to determine the pose, average the multiple pose values to determine the pose, and or otherwise combine the multiple pose values to determine the pose. The system may provide the determined poses and corresponding object identifiers to one or more components such as a robot, a robot control system, and/or a logistics system.

Figure 6:
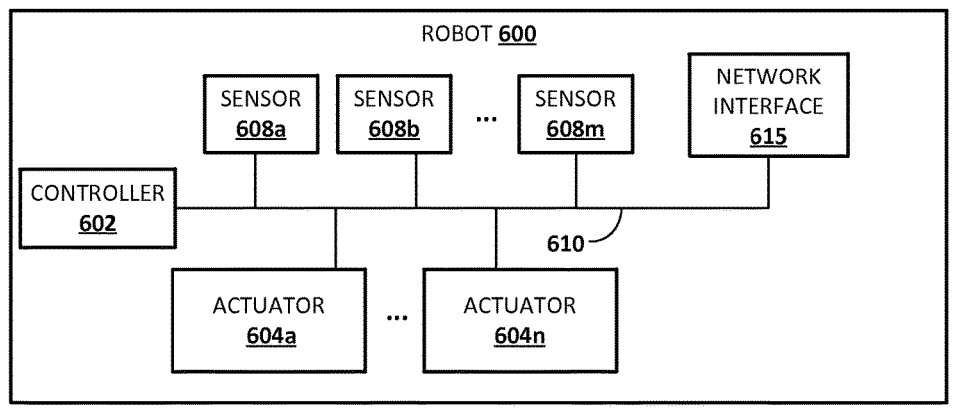
FIG. 6 schematically depicts an example architecture of a robot.

FIG. 6 schematically depicts an example architecture of a robot. Robot 600 may take various forms, including but not limited to a telepresence robot, a humanoid form, an animal form, a wheeled device, a submersible vehicle, an unmanned aerial vehicle ("UAV"), and so forth. In various implementations, robot 600 may include a controller 602. Controller 602 may take various forms, such as one or more processors, one or more field-programmable gate arrays ("FPGA"), one or more application-specific integrated circuits ("ASIC"), one or more so-called "real time controllers," and so forth.

In various implementations, controller 602 may be operably coupled with one or more actuators 604a-n and/or one or more sensors 608a-m, e.g., via one or more buses 610. Sensors 608a-m may take various forms, including but not limited to 3D sensors, cameras, depth sensors, light sensors, pressure sensors, pressure wave sensors (e.g., microphones), proximity sensors, accelerometers, gyroscopes, thermometers, barometers, and so forth. While sensors 608a-m are depicted as being integral with robot 600, this is not meant to be limiting. In some implementations, one or more sensors 608a-m may be located external to robot 600, e.g., as standalone units.

Controller 602 may provide control commands to the actuators 604a-n to accomplish one or more tasks. Those control commands include commands that direct the actuators 604a-n to drive wheels and/or other components to enable the robot 600 to traverse one or more paths autonomously, semi-autonomously, and/or in response to control commands provided by a computing device in response to user interface input at the computing device. Controller 602 may further provide control commands to generate all or aspects of observations described herein, receive and act upon one or more object poses determined based on a spatio-temporal model, and/or receive and act upon control commands such as those generated based at least in part on object poses determined based on a spatio-temporal model. Also, for example, controller 602 may establish a network connection with spatio-temporal model generation system 150 via network interface subsystem 615 and provide all or aspects of observations to the system 150. Network interface subsystem 615 provides an interface to outside networks and is coupled to one or more corresponding interface devices in one or more other computer systems such as a computing device engaged in a session with the robot. In some implementations, robot 600 may incorporate, in addition to other components, one or more aspects of a computer system, such as computer system 710 described below.

Figure 7:
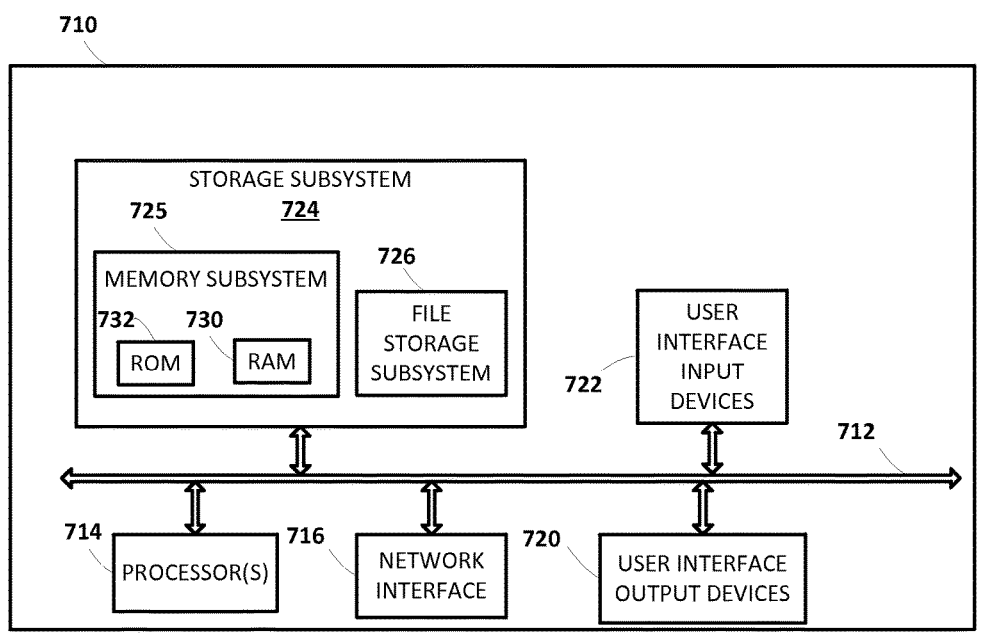
FIG. 7 schematically depicts an example architecture of a computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 500 and/or to implement one or more aspects of controller 602, engine 152, engine 154, engine 156, selector 172, selector 174, selector 176, and/or engine 178. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a CD-ROM drive, an optical drive, or removable media cartridges. Modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   accessing a spatio-temporal model stored in one or more computer readable media,
      the spatio-temporal model generated based on received observations from multiple robots operating in an environment over a period of time, and
      the spatio-temporal model defining, for each of a plurality of objects in the environment, a plurality of pose values and corresponding times for the pose values;
   identifying an object of the objects in the environment, and a target time;
   selecting, from the spatio-temporal model, a group of pose values for the object based on proximity of the target time to the corresponding times for the pose values of the group; and
   generating a pose for the object for the target time based on the selected group of the pose values.

2. The method of claim 1, further comprising:
   providing the pose for the object to at least one of the multiple robots;
   wherein in response to receiving the pose for the object, the at least one of the multiple robots utilizes the pose for path planning.

3. The method of claim 1, further comprising:
   generating robot control commands based on the pose for the object.

4. The method of claim 1, further comprising:
   identifying an area indication for the target time that defines one or more areas;
   wherein selecting the group of the pose values is further based on the pose values of the group defining a position that is proximal to or within the one or more areas defined by the area indication.

5. The method of claim 1, wherein the spatio-temporal model further defines, for each of the pose values, an uncertainty measure for the pose value, and wherein selecting the group of the pose values further comprises:
   selecting the group of the pose values based on the uncertainty measures associated with the pose values of the group.

6. The method of claim 1, wherein the spatio-temporal model further defines, for each of the pose values, a source identifier that indicates a corresponding source of a corresponding observation on which the corresponding pose value is based, and wherein selecting the group of the pose values further comprises:
   selecting the group of the pose values based on each of the pose values of the group being associated with the same source identifier in the spatio-temporal model.

7. The method of claim 1, wherein the spatio-temporal model further defines, for each of the pose values, a source identifier that indicates a corresponding source of a corresponding observation on which the corresponding pose value is based, and wherein selecting the group of the pose values further comprises:
   selecting the group of the pose values based on determining the pose value of the group are associated with multiple source identifiers in the spatio-temporal model and that a quantity of the pose values of the group satisfies a threshold.

8. A system, comprising:
   one or more computer readable media storing a spatio-temporal model, the spatio-temporal model generated based on received observations from multiple robots operating in an environment over a period of time, and the spatio-temporal model defining, for each of a plurality of objects in the environment, a plurality of pose values and corresponding times for the pose values;

a pose value selection component comprising one or more processors and instructions that, when executed by one or more of the processors, cause one or more of the processors to:

access the spatio-temporal model stored in the computer readable media;

identify an object of the objects in the environment, and a target time;

select, from the spatio-temporal model, a group of pose values for the object based on proximity of the target time to the corresponding times for the pose values of the group; and generate a pose for the object for the target time based on the selected group of the pose values.

9. The system of claim 8, wherein, in executing the instructions, one or more of the processors of the pose value selection component are further to:

provide the pose for the object to at least one of the multiple robots;

wherein in response to receiving the pose for the object, the at least one of the multiple robots utilizes the pose for path planning.

10. The system of claim 8, wherein, in executing the instructions, one or more of the processors of the pose value selection component are further to:

generate robot control commands based on the pose for the object.

11. The system of claim 8, wherein, in executing the instructions, one or more of the processors of the pose value selection component are further to:

identify an area indication for the target time that defines one or more areas;

wherein in selecting the group of the pose values, one or more of the processors are to select the group of the pose values based on the pose values of the group defining a position that is proximal to or within the one or more areas defined by the area indication.

12. The system of claim 8, wherein the spatio-temporal model further defines, for each of the pose values, an uncertainty measure for the pose value, and wherein in selecting the group of the pose values, one or more of the processors are to:

select the group of the pose values based on the uncertainty measures associated with the pose values of the group.

13. The system of claim 8, wherein the spatio-temporal model further defines, for each of the pose values, a source identifier that indicates a corresponding source of a corresponding observation on which the corresponding pose value is based, and wherein in selecting the group of the pose values, one or more of the processors are to:

select the group of the pose values based on each of the pose values of the group being associated with the same source identifier in the spatio-temporal model.

14. The system of claim 8, wherein the spatio-temporal model further defines, for each of the pose values, a source identifier that indicates a corresponding source of a corresponding observation on which the corresponding pose value is based, and wherein in selecting the group of the pose values, one or more of the processors are to:

select the group of the pose values based on determining the pose value of the group are associated with multiple source identifiers in the spatio-temporal model and that a quantity of the pose values of the group satisfies a threshold.

15. A system comprising:

a plurality of robots in an environment providing observations over a period of time;

a spatio-temporal model generation component, the spatio-temporal model generation component comprising one or more processors and instructions that, when executed by one or more of the processors, cause one or more of the processors to:

generate a spatio-temporal model based on the observations provided by the plurality of robots, the spatio-temporal model defining, for each of a plurality of objects in the environment, a plurality of pose values and corresponding times for the pose values;

a pose value selection component comprising one or more additional processors and additional instructions that, when executed by one or more of the additional processors, cause one or more of the additional processors to:

access the spatio-temporal model stored in the computer readable media;

identify an object of the objects in the environment, and a target time;

select, from the spatio-temporal model, a group of pose values for the object based on proximity of the target time to the corresponding times for the pose values of the group; and generate a pose for the object for the target time based on the selected group of the pose values.

* * * * *